No. 861,942. PATENTED JULY 30, 1907.
R. B. BENJAMIN.
ELECTRIC LAMP SOCKET.
APPLICATION FILED OCT. 17, 1904.
2 SHEETS—SHEET 1.
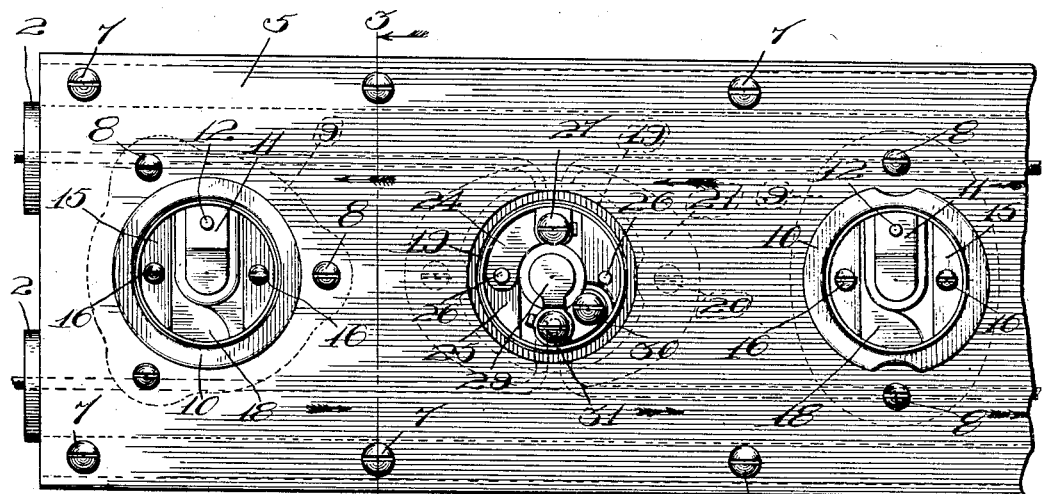
Witnesses:
Inventor:
Reuben B. Benjamin
by Jones & Addington
Attorneys No. 861,942. PATENTED JULY 30, 1907.
R. B. BENJAMIN.
ELECTRIC LAMP SOCKET.
APPLICATION FILED OCT. 17, 1904.
2 SHEETS—SHEET 2.
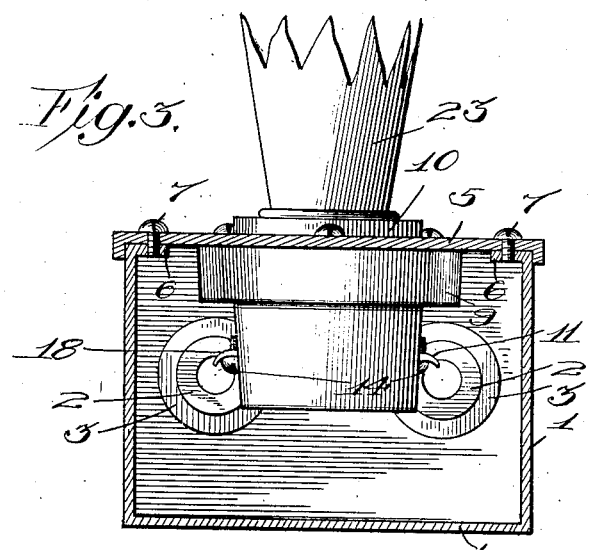
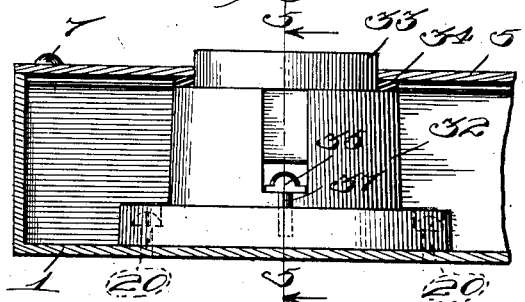
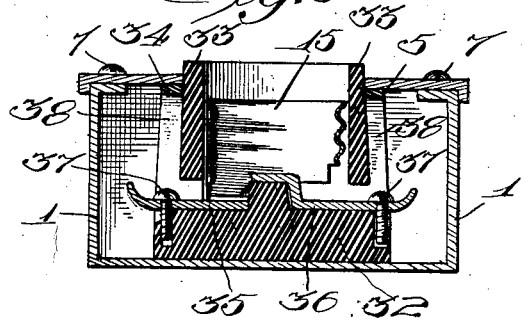
Witnesses:
Inventor
Reuben B. Benjamin
by Jones & Addington
Attorneys

UNITED STATES PATENT OFFICE.

REUBEN B. BENJAMIN, OF CHICAGO, ILLINOIS, ASSIGNOR TO BENJAMIN ELECTRIC MANUFACTURING COMPANY, OF CHICAGO, ILLINOIS, A CORPORATION OF ILLINOIS.

ELECTRIC-LAMP SOCKET.

No. 861,942.

Specification of Letters Patent.

Patented July 30, 1907.

Application filed October 17, 1904. Serial No. 228,889.

*To all whom it may concern:*

Be it known that I, REUBEN B. BENJAMIN, a citizen of the United States, residing at Chicago, in the county of Cook and State of Illinois, have invented new and useful Improvements in Electric-Lamp Sockets, of which the following is a full, clear, concise, and exact description, reference being had to the accompanying drawing, forming a part of this specification.

My invention relates to electric lamp sockets, and particularly to the arrangement of a row of electric lamp sockets within a metallic box or casing. In theaters and in many other places, it is desirable to have rows of electric lights, so mounted that said rows of lights may be conveniently moved from one place to another, and conveniently stored and taken care of when not in use, without danger of injury to the lamp sockets and without disconnecting the lamp sockets from the feed wires.

I have illustrated in the accompanying drawings, one form of my invention, which I have worked out for accomplishing the above results, the other novel features of which will appear from the following description of the drawings in which:

Figure 1 is a plan view of my invention showing the lamp sockets and their connections in dotted lines, and showing the lamps connected upon a single circuit; Fig. 2 is a longitudinal vertical sectional view of the invention, showing the lamps connected upon two circuits; Fig. 3 is a sectional view taken on the line 3—3 of Fig. 1; Fig. 4 is a sectional view showing a modification of my invention; and, Fig. 5 is a view taken on the line 5—5 of Fig. 4.

Like reference numerals are used to designate like parts in the several figures.

I preferably provide a metallic box or trough 1. Said trough may be of any desired length, and while I have shown a straight trough or box, any desirably shaped box or trough may be employed without departing from the spirit of my invention. The box or trough 1, preferably has insulating bushings 2, 2, disposed in the ends thereof, said bushings being secured to the box in a suitable manner, as by the nut 3, and having a central aperture 4 therein, said aperture being adapted to admit the supply wires to the trough or box 1. The trough or box 1 may have any desirable number of openings formed therein for the inlet and outlet of the feed wires, and said openings may be disposed in the box or trough 1 in any suitable manner. The box or trough 1 preferably has a sheet metal cover 5, said cover having apertures formed therein adapted to admit the lamps or lamp sockets, said cover being secured to the box or trough 1 in any suitable manner, said cover being shown as secured to an inwardly turned flange 6 formed upon the box or trough 1, by means of the screws or bolts 7, 7, as shown in Fig. 3, although this method of securing the lid or cover 5 in position is not essential. The box or trough 1 is constructed sufficiently large to permit ample room for any number of circuit wires to pass through the box and the row of lamp sockets disposed within the trough or box 1, may be connected up upon a single circuit as shown in Fig. 1, or upon two or any desired number of circuits, as shown in Fig. 2. The box or trough 1 being preferably formed of sheet metal is light, moisture and dust proof, and is sufficiently strong to protect the porcelain lamp sockets from injury when the trough or box is not in use.

Any desired form of lamp socket may be used with my improved trough or box, and said sockets may be secured therein in any suitable manner. I prefer to construct the lamp socket of porcelain or other suitable insulating material, the end sockets in Figs. 1 and 2 being secured to the lid or cover 5, by means of screws or bolts 8, 8, passing through the cover, and engaging a flange 9 formed upon the lamp socket. An annular shoulder or bead 10, is preferably adapted to extend through the aperture formed in the cover or lid 5. As will be seen, one of said lamp sockets is elliptical in form and secured in place by two screws 8, 8. This construction enables a larger number of sockets to be placed in position within a given trough or box than the other of said sockets which has three of the screws 8, 8, passing through the flange 9. Suitable center contact plates 11, 11, are secured to said sockets, preferably by the screws 12, 12, said contact plates extending through apertures 13, 13, preferably formed in the sides of the socket. The extended ends of said contact plates carry binding screws 14, 14, for making connection with the circuit or feed wires. The lamp receiving shells 15, 15, of said sockets are preferably secured in position by the screws 16, 16, suitable contact plates 18, 18, being adapted to project through apertures formed in the opposite sides of said sockets, said projecting ends of said contact plates carrying binding screws and being adapted to form electrical connection with the other circuit or feed wires, as before described with reference to the center contact plates. It will be understood that the detail construction of the lamp sockets above described is not essential, and may be varied without departing from the spirit of my invention.

The center lamp socket shown in Figs. 1 and 2, shows another form of my invention, in which the socket 19 is not secured to the cover 5, but is preferably secured to the bottom of the box or trough 1, said socket being shown as secured by screws or bolts 20, 20, passing through the flange 21, formed upon the base of the socket 19. The aperture in the socket 19 adapted to accommodate the lamp base is adapted to aline with an aperture 22, formed in the cover 5. The form of my invention illustrated by the centrally disposed socket 19 thoroughly protects the socket from injury when the trough or box 1 is not in use. It is desirable to build the trough or box 1 in sections, said sections being adapted to be connected together when in use, and being disconnected and thrown in a pile when not in use. It will be seen that in the modification illustrated by the socket 19, the lamps 23 could be removed from the sockets 19, and the sections of the row of lights or the troughs or boxes 1, could be thrown in a pile without danger of injury in any way to the lamp sockets 19, or its electrical connections, no part of the sockets being adapted to protrude through the openings 22 in the cover 5.

The socket 19 is shown with a contact plate 24, secured to the screw-threaded shell or outer lamp contact 25 by means of the screw or bolt 26, said contact plate carrying a binding screw 27, access to said binding screw being had preferably through an aperture 28 formed in the side of the socket 19, as shown in Fig. 2. The aperture 28 formed in the socket preferably has flaring walls, said walls serving to guide a loop formed in the feed wire to the binding screw, said binding screw being accessible from the front of the socket, as shown in Fig. 1. A center contact plate 29 is preferably secured in position by a screw or bolt 30, said contact plate being adapted to form electrical contact with the center contact of the lamp and carrying a binding screw 31, said binding screw being disposed within the socket 19, the leading-in wires being adapted to be secured to said binding screw through an aperture 28 formed in the side of the socket.

While I have particularly described the arrangement of the lamp contacts in the different forms of sockets, it will be understood that the detailed arrangement of said contacts may be varied and that the arrangement of the contact plates and binding screws above described in reference to the lamp socket 19, may be used in connection with the end sockets shown in Figs. 1 and 2, and the arrangement of the contacts and binding screws described in connection with said end sockets may be employed in connection with the socket 19, without in any way effecting the present invention.

Referring to Figs. 4 and 5, the lamp socket 32 is shown as secured to the bottom of the trough or box 1, by means of screws 20, 20, an annular flange 33 carried by the socket being adapted to project through the opening formed in the cover 5, a compression washer 34, preferably of rubber, being disposed between the cover 5 and the body of the socket 32. The contact plate 35 is suitably secured to the lamp receiving shell 15, and the contact plate 36, forming the center lamp contact, is secured to the socket in any suitable manner, said contact plates 35 and 36 carrying binding screws 37, 37, for making connection with the feed wires, said binding screws being accessible from the front of the socket, grooves 38, 38, being formed in the body of the socket 32 to more readily afford access to said binding screws.

While I have illustrated and described my invention with particular reference to the details of construction for the purpose of revealing my invention to others, I do not wish to limit myself to said details further than is defined in the appended claims.

Having described my invention what I claim as new and desire to secure by Letters Patent is:

1. In a device of the character described, the combination with a suitable box, of a plurality of lamp sockets arranged therein, each comprising an insulating base having a recess formed therein, a lamp receiving shell and associated contacts disposed in said recess, a pair of plates connecting with said contacts, binding posts carried by said plates and a supporting flange formed on said base having screws or bolts passing therethrough and securing the socket in position in said box said base having openings in the side walls thereof to permit the supply wires to be connected to the binding posts of the socket.

2. In a device of the character described, the combination with a suitable box, of a plurality of lamp sockets arranged therein, each comprising an insulating base having a recess formed therein, a lamp receiving shell and associated contacts disposed in said recess, a pair of plates connected with said contacts, binding posts carried by said plates and a supporting flange formed on said base having screws or bolts passing therethrough and securing the socket in position in said box, said base having openings in the side walls thereof to permit the connection of the supply wires to said binding posts and a removable cover for said box having openings therein registering with said sockets.

3. In a device of the character described, the combination with a suitable box, of a plurality of lamp sockets arranged therein, each comprising a suitable base having a recess formed therein and lamp contacts arranged within said recess and carrying binding posts accessible from the front of said box, said base having openings in the side walls thereof to permit the supply wires to be connected to said binding posts and a cover for said box having openings formed therein registering with said sockets.

4. In a device of the character described, the combination with a suitable box, of a plurality of lamp sockets arranged therein and secured to the bottom thereof, each comprising an insulating base having a recess formed therein, lamp sockets disposed within said recess, and binding posts accessible from the front of said box said base having openings in the side walls thereof to permit the connection of the supply wires to said binding posts.

5. In a device of the character described, the combination with a suitable box, of a plurality of lamp sockets arranged therein and secured to the bottom thereof, each comprising an insulating base having a recess formed therein, lamp contacts disposed within said recess, binding posts accessible from the front of the box, said base having openings in the side walls to permit the connection of the supply wires to the binding posts, and a cover for said box having openings therein registering with said sockets.

In witness whereof, I have hereunto subscribed my name in the presence of two witnesses.

REUBEN B. BENJAMIN.

Witnesses:
C. B. CANT,
E. A. OLSEN.